D. TURNER.
LOCK FOR CLOTH MEASURING AND COST COMPUTING MACHINES.
APPLICATION FILED SEPT. 13, 1919.
1,363,292. Patented Dec. 28, 1920.
3 SHEETS—SHEET 2.
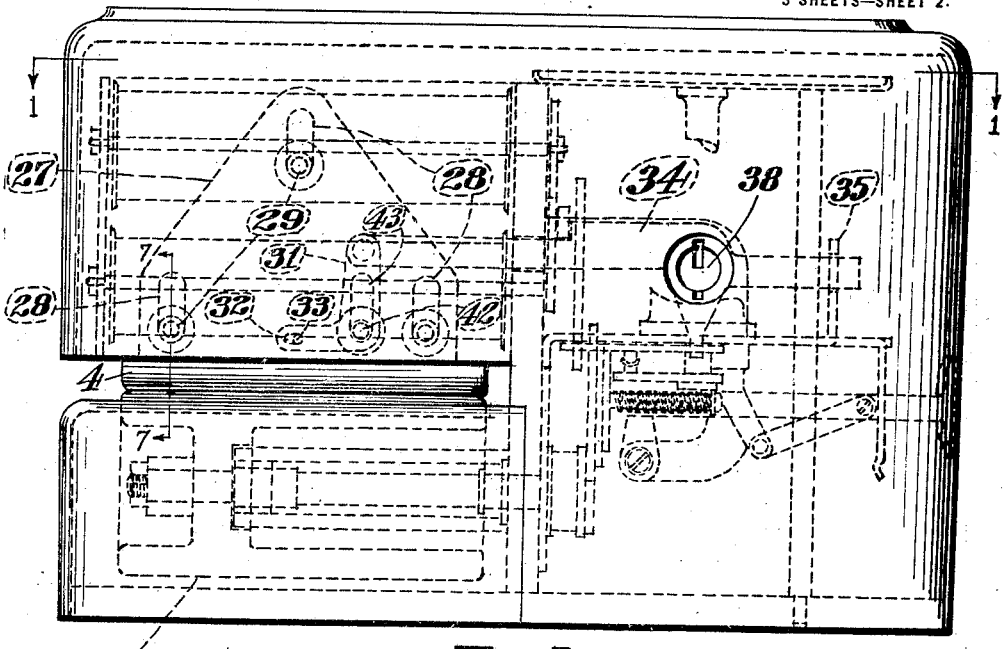
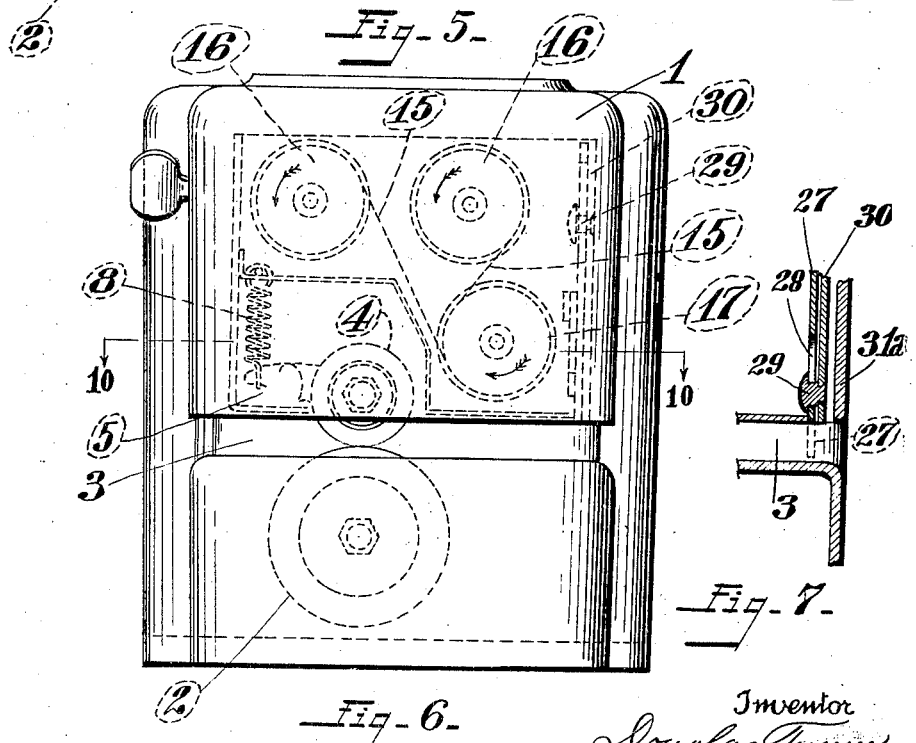

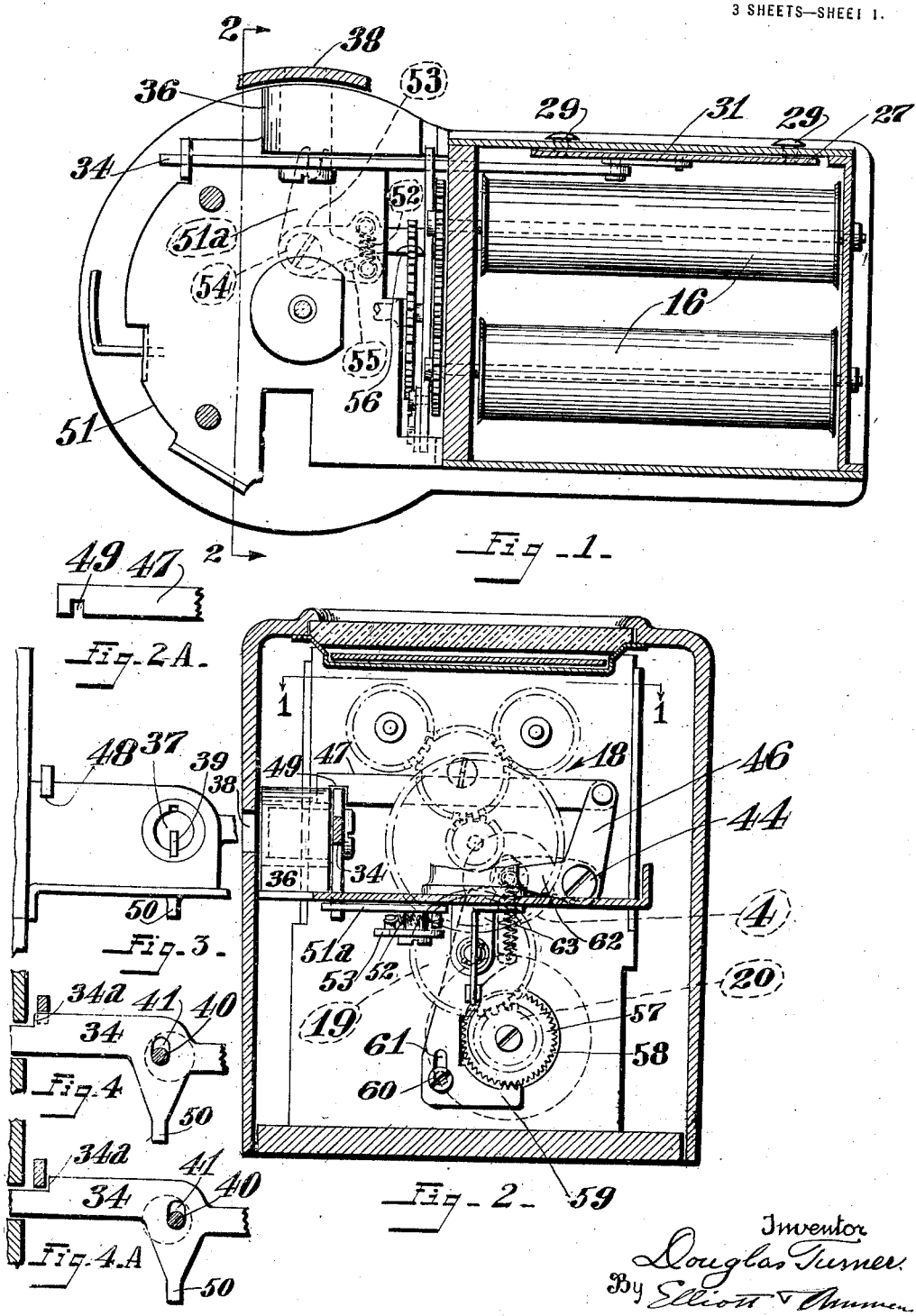

D. TURNER.
LOCK FOR CLOTH MEASURING AND COST COMPUTING MACHINES.
APPLICATION FILED SEPT. 13, 1919.
1,363,292.
Patented Dec. 28, 1920.
3 SHEETS—SHEET 3.
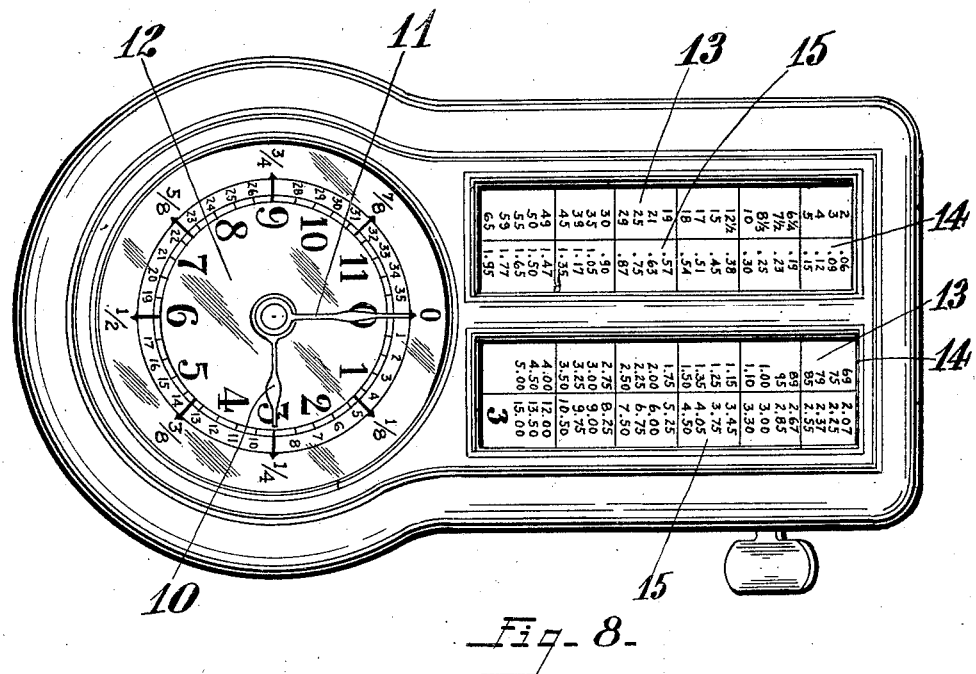
Fig. 8.
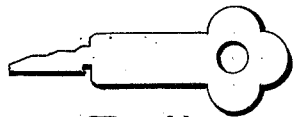
Fig. 11.
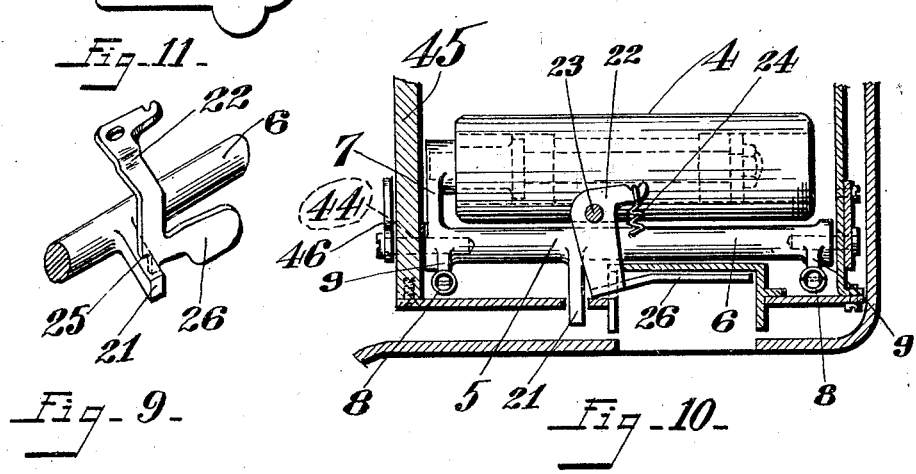
Fig. 9.
Fig. 10.
Inventor
Douglas Turner
By Elliott & Ammen
his Attorneys

UNITED STATES PATENT OFFICE.

DOUGLAS TURNER, OF ST. LOUIS, MISSOURI, ASSIGNOR TO THE MEASUREGRAPH COMPANY, OF ST. LOUIS, MISSOURI, A CORPORATION OF MISSOURI.

LOCK FOR CLOTH MEASURING AND COST COMPUTING MACHINES.

1,363,292.    Specification of Letters Patent.    Patented Dec. 28, 1920.

Application filed September 13, 1919. Serial No. 323,549.

*To all whom it may concern:*

Be it known that I, DOUGLAS TURNER, a citizen of the United States, residing in the city of St. Louis and State of Missouri, have invented new and useful Improvements in Locks for Cloth Measuring and Cost Computing Machines, of which the following is a specification.

This invention relates to cloth measuring and cost computing machines such as are used by salesmen in selling cloth at retail, and which compute the charge to be made for the cloth sold.

The general object of the invention is to provide simple means for locking the machine to prevent its use by unauthorized persons.

The invention consists in the novel features, and in the general combination of parts to be particularly described hereinafter, all of which contribute to produce a simple and efficient locking mechanism for a cloth measuring and cost computing machine. A preferred embodiment of my invention will be particularly described in the following specification, while the broad scope of my invention will be pointed out in the appended claims.

In the drawing,

Figure 1 is a horizontal section through a machine embodying my invention, taken about on the line 1—1 of Fig. 2;

Fig. 2 is a vertical section through the machine, taken about on the line 2—2 of Fig. 1;

Fig. 2ª is a detail elevation of part of a locking bar;

Fig. 3 is a detail elevation showing a part of the locking mechanism, as viewed from the rear side of Fig. 1;

Fig. 4 is another detail of the locking mechanism and showing the relation of certain parts when the mechanism is locked against use;

Fig. 4ª is a view similar to Fig. 4, but showing the relation of these parts when the machine is unlocked;

Fig. 5 is a side elevation of the machine;

Fig. 6 is an end elevation of the machine;

Fig. 7 is a vertical section taken through the casing at the gap where the cloth passes through the machine;

Fig. 8 is a plan of the complete machine;

Fig. 9 is a detail perspective illustrating the means for holding the presser-roller of the machine in its elevated position, that is to say, in the position which it assumes when it is removed from the measuring roller;

Fig. 10 is a section taken about on the line 10—10 of Fig. 6 and illustrating details of the presser roller frame; and Fig. 11 is a view illustrating a common type of key that may be used with the lock.

The machine to which my invention is applied comprises a case 1, (see Fig. 6), in the lower portion of which there is rotatably mounted, a measuring roller 2, located on one side of a gap 3 formed horizontally through the casing, and so that the upper face of the roller is located in the gap. Within the casing above this gap there is provided a presser roller 4 which coöperates with the measuring roller to press the cloth against its face when the cloth is being pulled through the machine. This presser roller 4 is preferably carried on a presser roller frame 5, (see Fig. 10), said frame comprising a rock shaft 6 having an arm 7 on which the presser roller is rotatably mounted, (see Fig. 10). When the presser roller is in use it is pulled down against the face of the measuring roller by means of two coil-springs 8, (see Figs. 5 and 10), which are attached to short arms 9 extending from the rock shaft 6. When the machine is in operation, the rotation of the measuring roller is imparted to indicating mechanism which indicates the length of the cloth measured, and the charge to be made for the same at any given price per yard.

This indicating mechanism is shown clearly in Fig. 8, and comprises a slow-moving hand or pointer 10 which indicates yards, and a fast-moving hand or pointer 11 which indicates inches and fractions of a yard. These hands move over a dial 12 numbered to indicate yards, inches and fractions of a yard.

The cost computing is effected by means of two fixed scales 13 which are disposed in two windows 14 in the upper side of the machine, and these scales carry numbers which are in alinement with rows of tabulated figures carried by movable members such as charts 15, (see Fig. 6), which wrap around computing rollers 16 disposed in the upper portion of the case directly under the windows 14. These charts 15, when the machine is not in use, are wrapped upon a drum 17. However, when the machine is being used, the rollers 16 are rotated in the direction indicated by the arrows in Fig. 6, so as to wrap up the charts upon them. The rollers 16 are driven through a suitable gear train indicated by the number 18 in Fig. 2, said gear train including a gear wheel 19 which is driven from a pinion 20 on the shaft of the measuring roller.

Referring again to the presser roller 4, and especially to Figs. 9 and 10, the machine is provided with means for holding the presser roller 4 elevated when it is not in use. For this purpose, the rocker-shaft 6 of the presser roller frame is provided with an arm 21 with which coöperates a latch 22 which is pivoted at 23. This latch is normally pulled by a spring 24 so that when the presser roller is raised, and the arm 21 descends, the spring 24 will pull the latch 22 in the direction to cause a shoulder 25 on the latch to engage over the arm 21, (see Fig. 9). The spring will hold the presser roller raised in this way until a thumb-plate 26 on the latch 22 is pushed inwardly, (see Fig. 10). This will extend the spring 24 and disengage the shoulder 25 so as to permit the arm 21 to swing upwardly, thereby permitting the presser roller 4 to descend onto the face of the measuring roller.

I provide means for obstructing the gap 3 automatically when the machine is locked, in order to prevent a piece of cloth from being introduced into the gap. To accomplish this, I provide a guard-apron 27 in the form of a plate, (see Fig. 5,) which plate may be guided by means of slots 28 in the plate, through which guide pins 29 pass, the guide pins being secured in a vertical frame plate 30 located just inside the side wall 31ᵃ of the case. The guard plate or apron 27 is normally held elevated, (see Fig. 7), but when the machine is locked, the plate descends into the position indicated by dotted lines in Fig. 7, at which time it obstructs the gap 3. In order to move the plate down, I provide a bell crank lever 31, (see Fig. 5), having a horizontal arm with a slot 32 which receives a pin 33, said pin projecting from the side of the guard apron plate 27. The vertical arm of this lever 31 is attached to a horizontal shift-bar 34, the opposite end of which is guided to slide in a fixed guide bracket 35. This shift bar is adapted to be actuated by the locking device or lock, which, if desired, may be controlled by a key, for example, I may provide a simple form of lock including a lock case 36, carrying a barrel 37 lying opposite to a window 38 in the wall of the case, (see Figs. 1 and 3). By inserting a key such as that shown in Fig. 11 in the slot 39, the barrel 37 may be rotated. This barrel carries an eccentric pin 40, (see Figs. 4 and 4ᵃ), and this eccentric pin is received in a vertical slot 41 in the aforesaid shift bar 34. In Figs. 4 and 4ᵃ the shift bar is shown in its two positions, the former of which indicates the locking position, and the latter of which indicates the unlocked position. When the barrel 37 is rotated by means of the key inserted at the window 38, the shift-bar 34 moves toward the left, as viewed in Figs. 4, 4ᵃ and 5. This depresses the horizontal arm of the bell crank lever 31 and it moves the apron 27 down until its lower edge obstructs the gap.

It should be noted in connection with the plate 27, that the bell crank lever 31 is supported on a pivot pin 42 which is mounted on the same plate 30 that operates as a guide for the plate 27, and as the bell crank lever is on the side of the plate 27, remote from the plate 30, it is necessary to provide a slot 43 in the plate 27 to allow clearance for the pin and to permit the apron 27 to descend. This slot is clearly shown in Fig. 5.

I utilize this shift-bar 34 to lock the presser roller 4 in its elevated position so that it cannot be operated in the regular way if the machine is locked. For this purpose, I provide the end of the rocker-shaft 5 of the presser roller with a pin 44, (see Fig. 10), which extends through a vertical frame plate 45, and beyond the plate 45 this pin carries rigidly an upwardly extending bell-crank arm 46 (see Fig. 2). To this arm 46 I attach a horizontal member or slide bar 47, the outer end of which is guided to slide in a notch 48 in the lock casing 36, (see Fig. 3). This end of the slide bar 47 is provided with a notch 49, (see Fig. 2ᵃ). When the presser roller is in its elevated position, in which it is indicated in Fig. 2, this notch 49 is in alinement with the aforesaid shift-bar 34, and when the shift bar is actuated, its shoulder 34ᵃ, (see Fig. 4ᵃ), moves into this notch, (see Fig. 4), and this locks the bar 47 against longitudinal movement and consequently locks the presser roller in its elevated position.

I also provide means for locking the gear train 18 against movement, and this is preferably effected by locking the gear 19 against rotation. In order to accomplish this I provide the shift-bar 34 with a downwardly projecting finger 50, (see Fig. 4), and the lower end of this finger is received in a slot formed on the end of a bell crank lever 51ᵃ, mounted on the underside of a horizontal frame plate 51, (see Figs. 1 and 2). The opposite arm of this bell-crank lever is connected by a spring 52, (see Fig. 1), with a trigger 53 which is pivoted on a pivot pin 54 of the bell-crank lever, and which is normally pulled by the spring 52 up against a stop pin 55 on the bell-crank lever. The end of this latch or trigger 53 lies near the edge of the gear wheel 19, and the edge of the trigger adjacent the gear wheel is provided with a beveled edge 56. Now when the shift-bar 34 moves toward the right, as viewed in Fig. 1, in the locking movement, the bell-crank lever 51ª is actuated by the finger 50 so that the spring 52 pulls the trigger 53 into engagement with the teeth of the gear wheel 19. This will prevent the gear wheel 19 from rotating, and will prevent transmission of movement from the measuring roller to the indicating mechanism.

I also provide for locking the measuring roller against rotation when the presser roller is held elevated. In order to accomplish this, I provide the shaft of the measuring roller, (see Fig. 2), with a wheel 57 having serrations 58 on its periphery, and adjacent to this wheel 57 I provide a shoe or plate 59 which is guided to slide on the vertical frame plate 45 by means of a pin 60 and a slot 61. This shoe has serrations corresponding to the serrations 58, and I provide means for pulling the shoe up when the machine is locked, in such a way as to cause the shoe to engage the wheel and hold the measuring roller against rotation. In order to accomplish this, I provide a bell-crank arm 62 rigid with arm 46, (see Fig. 2), and this arm 62 is connected by a spring 63 with the aforesaid shoe 59. Now when the presser roller is in its elevated position, the arm 62 exerts tension in the spring 63 and pulls the shoe 59 up against the serrated wheel 57, thereby holding the same against rotation. It will be understood that the spring 63 operates as a yielding means of connection for operating the shoe 59, and hence if the teeth of the shoe should happen to engage on the points of the teeth of the wheel 57, no injury will be done to the engaging parts, but the tension of the spring will simply increase, and, at this time, if it were attempted to rotate the measuring roller 2, a movement of the measuring roller through a slight angle would suffice to enable the teeth of the shoe 59 to engage properly with the serrations of the wheel 57 and thereby lock the measuring roller securely against rotation.

I shall now briefly describe the general mode of operation of the entire machine.

The indicating mechanism being in its zero position, the cloth to be measured is introduced in the gap 3 between the measuring roller 2 and the presser roller 4 while the presser roller is held in its elevated position, (see Fig. 2). By pressing on the thumb-plate 26, the arm 21 will be released from the shoulder 25, and the springs 8 will then pull the presser roller down against the measuring roller. The cloth is now pulled through the machine. In passing through the machine, the cloth rotates the measuring roller, and this operates through the gear train 18 to drive the charts 15 from the indicating mechanism; the charts coöperate with the scales 13 to indicate the computed charge which is to be made to the customer for the amount of cloth measured; the hands 10 and 11 driven in any suitable manner, indicate the measurement of the cloth.

When it is desired to lock the machine to prevent it from being used by an unauthorized person, the proper key is inserted in the key slot 39, (see Fig. 3), and the barrel 37 is rotated. The eccentric pin 40 in the barrel 37 causes the shift-bar 34 to shift longitudinally. In doing so its actuates the bell-crank lever 31 to depress the guard apron or plate 27 into the gap 3 which will prevent cloth being introduced into the gap. This shifting movement of the shift-bar 34 also operates to move the shoulder 34ª of the shift-bar into engagement with the notch 49 of the horizontal bar 47, and this locks the presser roller frame 5 so that the presser roller cannot be let down onto the measuring roller. In addition to this, the shifting movement of the shift-bar 34 actuates bell-crank lever 51ª, (see Fig. 1), and this operates through the spring 52 to pull the trigger 53 into engagement with the teeth of gear wheel 19, which would prevent the gear train from being driven.

When the presser roller is in its elevated position, it places tension in spring 63 through the medium of arm 62, (see Fig. 2), and this operates to pull the shoe 59 up so that its teeth engage the teeth of the wheel 57 which is rigid with the shaft of the measuring roller. This locks the measuring roller against rotation.

It is evident that in use the lock simply operates to prevent a part (or parts) of the machine from performing its normal function.

I have provided more than one means for locking the machine. This is advantageous for several reasons, one of which is that if one of the locking means gets out of order, any of its parts can be removed from the machine to be repaired while the other locking means carried by the machine will still operate effectively to prevent the machine from being used when it is locked.

By reason of the spring 52, it will be evident that if the trigger 53 should engage the end of a tooth instead of engaging in the space between two teeth, the slightest movement of the gear train would operate to lock the gear train, because as soon as the gear wheel 19 moved, the spring would immediately pull the trigger into position between two teeth.

It is understood that the embodiment of the invention described herein is only one of the many embodiments my invention may take, and I do not wish to be limited in the practice of my invention, nor in my claims, to the particular embodiment set forth.

What I claim and desire to secure by Letters Patent is:

1. In a cloth measuring and computing machine, the combination of a case having a gap therein, a measuring roller rotatably mounted opposite said gap, a plurality of gear wheels constituting a gear train driven by the measuring roller, indicating mechanism actuated by the gear train, a presser roller frame, a presser roller carried thereby to coöperate with the measuring roller, means for holding said presser frame in a position to hold the presser roller against the measuring roller, or in a position removed from the measuring roller, a lock, means controlled by said lock for obstructing said gap, means controlled by said lock for engaging a gear wheel in said train of gears, and means actuated by the presser roller frame for locking the measuring roller against rotation.

2. In a cloth measuring and computing machine, the combination of indicating mechanism, a lock, and means controlled by the lock for obstructing a part of the machine to prevent the same from performing its function.

3. In a cloth measuring and computing machine, the combination of a case, a measuring roller mounted in said case, a presser roller coöperating therewith and movable away from the measuring roller to form a gap through which the cloth may be introduced, indicating mechanism actuated by said measuring roller, a lock, and means controlled thereby for obstructing the path of the cloth in passing between the measuring roller and the presser roller to prevent the machine from being used.

4. In a cloth measuring and computing machine, the combination of a case having a gap therethrough, a measuring roller mounted in said case opposite said gap, a presser roller coöperating with the measuring roller to press the cloth against the measuring roller, indicating mechanism actuated by said measuring roller, a lock, and means controlled by said lock for obstructing said gap.

5. In a cloth measuring and computing machine, the combination of a measuring roller, indicating mechanism actuated thereby, a presser roller coöperating with the measuring roller, means for holding the presser roller against, or in a position removed from the measuring roller, indicating mechanism actuated by the measuring roller, and means for locking the measuring roller against rotation when the presser roller is held in a position removed from the measuring roller.

6. In a cloth measuring and computing machine, the combination of a measuring roller, indicating mechanism actuated thereby, a presser roller coöperating with the measuring roller, means for holding the presser roller against, or in a position removed from the measuring roller, indicating mechanism actuated by the measuring roller, a wheel rigid with the measuring roller and having serrations, and a shoe connected with the presser roller and mounted to move into engagement with the serrations when the presser roller is held removed from the measuring roller.

7. In a cloth measuring and computing machine, the combination of a measuring roller, indicating mechanism actuated thereby, a movable presser roller frame, a presser roller carried thereby coöperating with the measuring roller, means for holding the presser roller frame in a position to hold the presser roller against the measuring roller and in a position to hold the presser roller removed from the measuring roller, a wheel having a serrated periphery rigid with the measuring roller, a serrated shoe mounted to move into engagement with the wheel to lock the measuring roller against rotation, and means for connecting said shoe with said presser roller frame operating to hold the shoe against the wheel when the presser roller is held removed from the measuring roller.

8. In a cloth measuring and computing machine, the combination of a measuring roller, indicating mechanism actuated thereby, a movable presser roller frame, a presser-roller carried thereby coöperating with the measuring roller, means for holding the presser roller frame in a position to hold the presser roller against the measuring roller and in a position to hold the presser roller removed from the measuring roller, a wheel having a serrated periphery rigid with the measuring roller, a serrated shoe mounted to move into engagement with the wheel to lock the measuring roller against rotation, and a spring for yieldingly connecting said shoe with said presser roller frame operating to hold the shoe against the wheel when the presser roller is held removed from the measuring roller.

9. In a cloth measuring and computing machine, the combination of a measuring roller, a plurality of gear wheels constituting a gear train driven by the measuring roller, indicating mechanism actuated by the gear train, a lock, and means controlled thereby for engaging one of the gears of the gear train to prevent the same from actuating the indicating mechanism.

10. In a cloth measuring and computing machine, the combination of a measuring roller, a presser roller coöperating therewith, a presser roller frame carrying the presser roller mounted to rock on an axis of rotation, to hold the presser roller against the measuring roller or in a position removed from the measuring roller, a member connected with the presser roller frame, and moving therewith, when the presser roller frame is moved, said member having a notch therein, a lock, and a bar controlled by said lock for engaging the notch to lock the presser roller frame against movement.

11. In a cloth measuring and computing machine, the combination of a case having a gap therein, a measuring roller rotatably mounted at one side of said gap, a movable plate for obstructing the gap, indicating mechanism, a gear train for actuating the indicating mechanism from the measuring roller, a lock, and means actuated by said lock for moving the plate into the gap.

In testimony whereof, I have hereunto set my hand.

DOUGLAS TURNER.